T. KIHLGREN.
REDUCING APPARATUS.
APPLICATION FILED OCT. 13, 1913.

1,098,324.

Patented May 26, 1914.
3 SHEETS—SHEET 1.

WITNESSES:

INVENTOR.
Theodor Kihlgren.
BY
ATTORNEY.

T. KIHLGREN.
REDUCING APPARATUS.
APPLICATION FILED OCT. 13, 1913.

1,098,324.

Patented May 26, 1914.
3 SHEETS—SHEET 2.

WITNESSES:

INVENTOR.
Theodor Kihlgren.
BY
ATTORNEY.

T. KIHLGREN.
REDUCING APPARATUS.
APPLICATION FILED OCT. 13, 1913.
1,098,324.
Patented May 26, 1914.
3 SHEETS—SHEET 3.
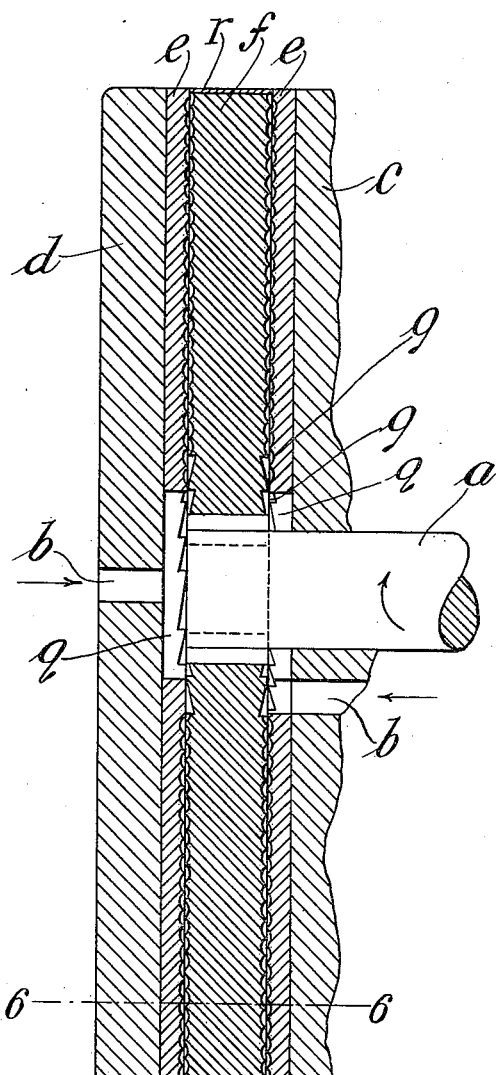
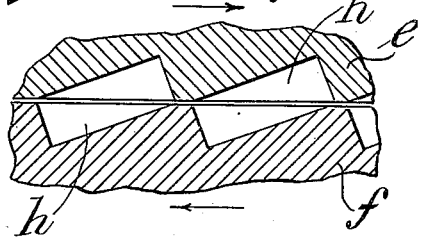
WITNESSES:
INVENTOR.
Theodor Kihlgren.
BY
ATTORNEY.

UNITED STATES PATENT OFFICE.

THEODOR KIHLGREN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

REDUCING APPARATUS.

1,098,324.  Specification of Letters Patent.  Patented May 26, 1914.

Application filed October 13, 1913. Serial No. 794,870.

*To all whom it may concern:*

Be it known that I, THEODOR KIHLGREN, a citizen of the United States of America, residing at Springfield, in the county of Hampden and State of Massachusetts, have invented new and useful Improvements in Reducing Apparatus, of which the following is a specification.

This invention relates to reducing or refining disks for reducing chocolate or similar material to a desired degree of fineness. It is more particularly adapted for use in such a machine as is disclosed in U. S. Patent to Bausman, No. 1,035,304, dated August 13, 1912.

The object of the invention is to provide a refining or reducing apparatus which will operate to reduce a material such as chocolate by a sliding or pinching of the chocolate as distinguished from a grinding action. With this object in view, the invention will be described for the purpose of illustration with reference to the accompanying drawings in which—

Figure 1:
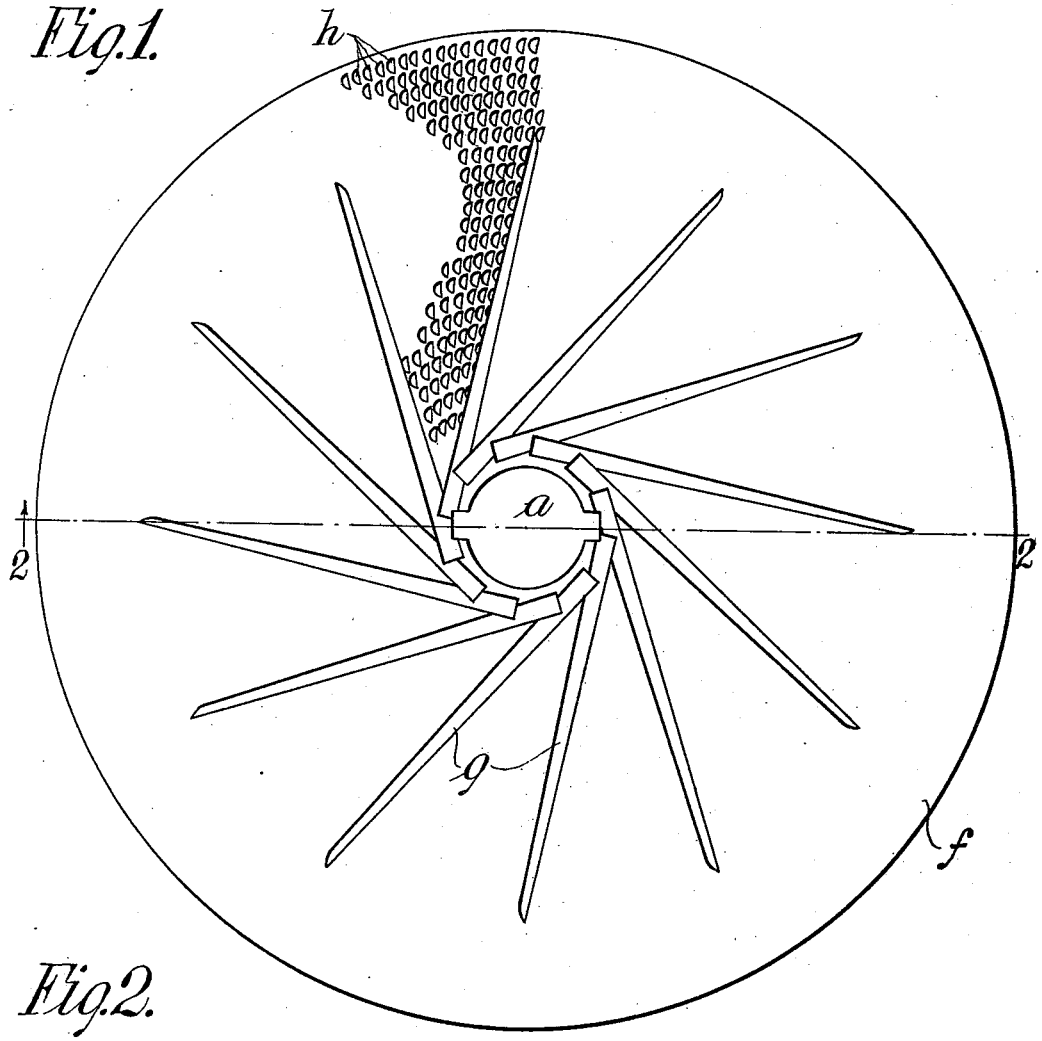
Figure 2:
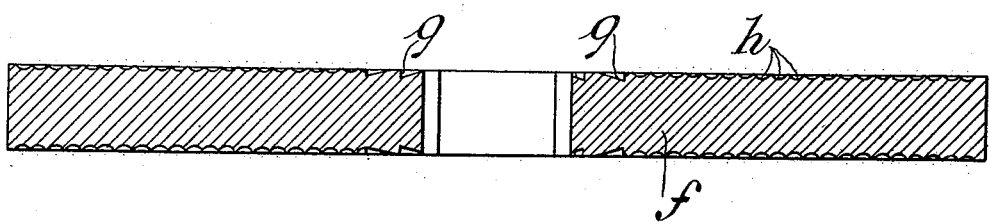
Figure 3:
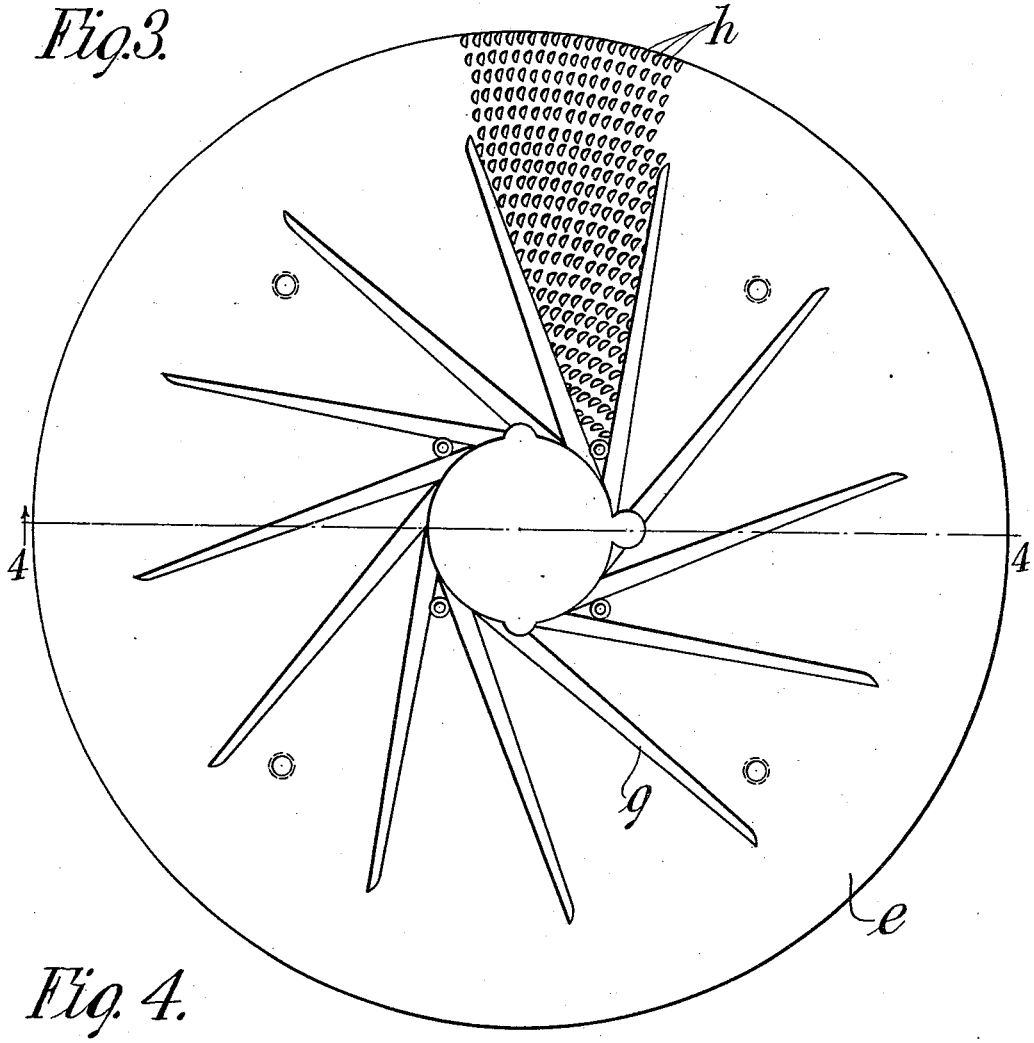
Figure 4:
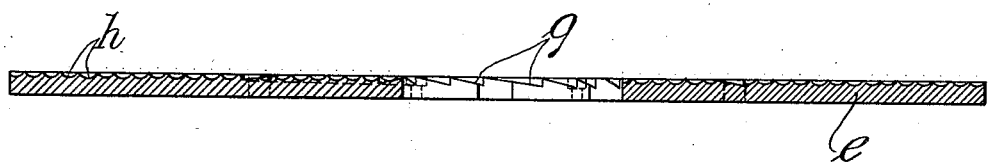

Figure 1 represents a plan view of the rotatable reducing disk; Fig. 2 is a section taken on the line 2—2 of Fig. 1; Fig. 3 is a plan view of a stationary companion disk to that shown in Fig. 1; Fig. 4 is a cross-section taken on line 4—4 of Fig. 3; Fig. 5 is a cross-section taken through the reducing mill showing the grinding disks rotatable and stationary as assembled for operation; and Fig. 6 is a detail sectional view taken on line 6—6 of Fig. 5 showing the manner in which the spoonlike recesses in the companion disks coöperate in the refining operation.

Referring to Fig. 5, a rotatable disk $f$ is keyed on the shaft $a$ and on each vertical surface of the disk $f$ are cut recesses $h$ together with feeding and cutting grooves $g$. Adjacent each one of these surfaces are disks $e$, each fastened to a stationary supporting part of the frame such as $d$ and $c$. The chocolate in a semi-liquid form is fed in through pipes $b$, one leading to each side of disk $f$, as indicated by the arrows, into spaces $q$. As the shaft $a$ rotates, chocolate is fed out between the disks $e$ and $f$ by means of the feeding and cutting grooves $g$ on the two faces of disk $f$ and on the single faces of disks $e$. These latter grooves, as shown in Figs. 1 and 2, extend approximately in a tangential direction to the shaft $a$ for a suitable distance toward the circumference of the disks. Each of these grooves comprises a right angle recess in the faces of the refining disks as shown in Fig. 2, and, as they approach the circumference of the refining disks, the cross-section of the recess becomes smaller and smaller.

It will be noticed by comparing Figs. 1 and 3 that the slots or grooves $g$ in the disks $e$ match the grooves in the disk $f$ when the apparatus is assembled. By this arrangement, as the disk $f$ is rotated with relation to the disks $e$, the cutting and feeding grooves $g$ on opposite adjacent faces of the disks pass one another with a scissorlike action. The effect of this arrangement is to cut or grind the larger or lumpy masses of chocolate into a condition suitable for the reducing operation carried on by the recesses $h$ in each disk. These recesses $h$ are milled in the face of each disk from the center to the circumference thereof and are arranged over the entire faces of the disks except where the grooves $g$ occur. It will thus be seen that the face of each disk comprises a set of feeding and cutting grooves $g$ between each and around the outer edge of which are the circular series of recesses $h$, there being several thousands of the latter on each disk. A cross-section of two of the recesses $h$ is shown in Fig. 6. Each one of these recesses has a spoonlike form, the base of which extends at an angle to the axis of the disk for a slight distance in the disk and then starts to slope up to the surface of the disk in a fanlike manner. The bases of the recesses $h$ in the disk $f$ are arranged approximately parallel to the direction of grooves $g$, but the bases of the recesses in the disk $e$ vary in arrangement from a direction approximately at right angles to the base of the recesses in the disk $f$ to a direction parallel thereto as the circumference of the disk is approached. This particular arrangement shown for these recesses is not absolutely necessary but is found to be of considerable advantage. They may, if desired, be arranged in various ways without departing from the broad scope of my invention.

It will be noted (see Fig. 5) that the circular series of recesses in any one disk is arranged in overlapping or staggered relation to the series of recesses on the adjacent disk. This is important for the reason that a greater pinching and rubbing effect is given the material as it works from one series of recesses to another in approaching the circumference of the disks. By this means also adjacent flat surfaces are avoided. Between such surfaces, the chocolate would quickly burn and soon harden to destroy the disks. The general arrangement of the recesses I believe to be broadly new.

As the disk $f$ (referring to Fig. 5) rotates, the chocolate in its coarser form and in a semi-liquid condition is fed from the spaces $q$ along each groove $g$ in the several disks. These quickly reduce the chocolate to a greater degree of fineness before it enters into the recesses $h$. As these recesses pass one another on opposite adjacent disks, as indicated by the arrows in Fig. 6, the chocolate contained therein is given a very severe sliding, pinching, or rubbing action as distinguished from a cutting action. Because of the arrangement of the grooves $g$ and the recesses $h$, this pinching or sliding action will be continued as the chocolate works out from one series of recesses to another. The staggered or overlapping arrangement of the series of recesses on adjacent disks aids in both the outward feeding of the chocolate and in the rubbing action. As the chocolate gets finer and finer on approaching the circumference, the necessity of the grooves $g$ diminishes, and the latter are, therefore, gradually closed up. The chocolate is thus refined as it passes from the center of the disks to the circumference thereof. The feeding of the chocolate is facilitated by means of the grooves $g$ which also insure the reduction of any lumpy or coarse chocolate to a condition suitable for the finer reducing action. The recesses $h$ in passing one another move the chocolate from recess to recess and from one series of recesses to another, at the same time giving it a rubbing, sliding, and pinching action. This rubbing, sliding, and pinching action I have found by experiment to be most effective in refining material like chocolate. The shield $r$ around the middle of the circumference of the disk $f$ prevents the chocolate from leaving the disks at any point except immediately above the guide $j$. As the chocolate leaves the circumference of the disks, it flows down the guide into any suitable receptacle, and, if it is desired to refine it further, it can be again passed through the apparatus.

I am aware that my invention broadly may be utilized in other specific ways than the one I have shown for the purposes of illustration. I, therefore, do not intend this disclosure to be understood as limiting the invention to the specific form shown.

What I claim is:

1. A refining apparatus, comprising, relatively rotatable disks on the opposite adjacent faces of which are provided circularly arranged series of small spoonlike recesses, the series of one disk being arranged in staggered relation to the series of the other disk so that a recess on one disk will act as a free passage between two radially adjacent recesses on the other disk whereby opposite flat rubbing surfaces are avoided.

2. A refining apparatus comprising relatively rotatable disks on the opposite adjacent faces of which are arranged in sets of circular series small spoonlike recesses, a series of feed-grooves extending from the center of the disks toward the circumference thereof, the bases of the recesses in one disk being arranged reversely to the bases of the recesses in the other disk, and the circular series of recesses on one disk arranged so that the recesses thereof provide a free passage between two circular series on the other disk whereby flat rubbing surfaces are avoided.

3. A refining apparatus comprising relatively rotatable disks on the opposite adjacent faces of which are provided many small spoonlike recesses, and a series of feed and cutting grooves extending from the center of the disks toward the circumference and at an angle to the radii thereof, the bases of the recesses in one disk being arranged reversely to the bases of the recesses in the other disk, all constructed and arranged so that the recesses on one disk will pass in staggered relation to the radially adjacent recesses on the other disk in the rotative movement.

4. A refining apparatus comprising relatively rotatable disks on the opposite adjacent faces of which are provided many small spoonlike recesses arranged in circular sets of concentric series of recesses, the series in one face being arranged in radial staggered relation to the series in the other face.

5. A refining apparatus, comprising, two relatively rotatable disks, one having radial sets of circularly arranged small spoonlike recesses, the base of each recess being substantially a straight line and each recess being deepest adjacent its base and gradually sloping upwardly to the surface of the disk in a fanlike form, the bases of those recesses near the center of the disk being in a line substantially at right angles to the line of the bases of the recesses near the circumference of the disk along a radial line of the disk, the line of the bases of recesses as the circumference of the disk is approached gradually changing from one extreme to the other and radial sets of circularly arranged small spoonlike recesses on the other disk of substantially the same shape having the line of the bases substantially parallel to the line of the bases of the recesses near the circumference of the other disk.

THEODOR KIHLGREN.

Witnesses:
F. G. NEAL,
H. E. HARTWELL.

Copies of this patent may be obtained for five cents each, by addressing the "Commissioner of Patents, Washington, D. C."